United States Patent
Grosspietsch et al.

Patent Number: 5,964,333
Date of Patent: Oct. 12, 1999

[54] FRICTION CLUTCH AND A SLAVE CYLINDER FOR THE OPERATION OF A FRICTION CLUTCH

[75] Inventors: Wolfgang Grosspietsch; Herbert Voit; Angelika Ebert, all of Schweinfurt, Germany

[73] Assignee: Fichtel & Sachs AG, Schweinfurt, Germany

[21] Appl. No.: 08/869,455

[22] Filed: Jun. 5, 1997

[30] Foreign Application Priority Data

Jun. 7, 1996 [DE] Germany ............... 196 22 773

[51] Int. Cl.⁶ .............. F16D 25/08; F16D 23/14
[52] U.S. Cl. ................. 192/85 CA; 192/91 A; 192/98; 92/107; 92/130 B
[58] Field of Search ............ 192/85 CA, 91 A, 192/98; 92/107, 130 B, 130 C; 267/166

[56] References Cited

U.S. PATENT DOCUMENTS

| | | | |
|---|---|---|---|
| 4,328,883 | 5/1982 | Shellhause | 192/85 CA |
| 4,901,987 | 2/1990 | Greenhill et al. | 267/166 |
| 5,211,099 | 5/1993 | Grosspietsch et al. | 92/107 |
| 5,267,637 | 12/1993 | Wilbur et al. | 192/85 CA |
| 5,480,017 | 1/1996 | Uenohara et al. | 192/98 |
| 5,622,358 | 4/1997 | Komura et al. | 267/166 |
| 5,779,019 | 7/1998 | Grosspietsch et al. | 192/85 C |

FOREIGN PATENT DOCUMENTS

| | | |
|---|---|---|
| 4109125 | 9/1992 | Germany . |
| 4113925 | 11/1992 | Germany . |
| 4410963 | 10/1994 | Germany . |
| 2241754 | 9/1991 | United Kingdom . |
| 2251911 | 7/1992 | United Kingdom . |
| 2269874 | 2/1994 | United Kingdom . |

OTHER PUBLICATIONS

U.S. Patent Application Serial No. 08/771,865, filed Dec. 23, 1996.

*Primary Examiner*—Richard M. Lorence
*Attorney, Agent, or Firm*—Nils H. Ljungman & Associates

[57] ABSTRACT

A slave cylinder for the operation of a friction clutch, especially in motor vehicles, with a housing, an inner portion, an annular or cylindrical piston which annular piston is positioned between the housing and the inner portion, a clutch release sleeve or clutch throwout sleeve or coupling socket joint which clutch release sleeve is in contact with the annular piston and can be axially displaced with respect to the housing, as well as a spring or pressure spring or compression spring which is supported by both the clutch release sleeve and the housing, and radial shoulders or steps or reliefs provided at the clutch release sleeve and at the housing to secure against torsion. The pressure spring may be characterized as a sinuous spring or zig-zag or no-sag spring. The ends of the pressure spring are positioned to make contact at the ends of the shoulders which shoulders act in the opposite direction to secure against torsion.

18 Claims, 3 Drawing Sheets

FRICTION CLUTCH AND A SLAVE CYLINDER FOR THE OPERATION OF A FRICTION CLUTCH

BACKGROUND OF THE INVENTION

1. Field of the Invention

The present invention relates to a slave cylinder for the operation of a friction clutch, especially in motor vehicles, with a housing, an inner portion, and an annular or cylindrical piston which is arranged between the housing and the inner portion. The friction clutch also includes a clutch release sleeve or clutch throwout sleeve or coupling socket joint which is in contact with the annular piston, and which clutch release sleeve can be axially displaced with respect to the housing, as well as a spring or pressure spring or compression spring. The spring is supported by both the clutch release sleeve and the housing, and the spring is secured against torsion.

2. Background Information

Such a slave cylinder is known from German Patent No. 41 09 125 A1, for example. In motor vehicles, the slave cylinder is interconnected to a master cylinder, which master cylinder is activated by means of the clutch pedal to operate the friction clutch. When pressure is applied to the slave cylinder, the annular piston arranged in said slave cylinder is displaced, which displacement presses the clutch release sleeve against the membrane spring of the clutch and disengages the clutch. In order to pre-stress the clutch release sleeve, it is loaded by the pressure spring. In this way, a portion of the disengagement path of the clutch release sleeve is preset, and an undefined reaction during operation is not possible. Said undefined reaction would be possible if the clutch release sleeve was able to move axially due to vibrations when the friction clutch was engaged, and would temporarily activate and deactivate. This would not only lead to a premature fatigue of the clutch release sleeve, but would also create noises which would reduce the comfort level, considering the increasing trend toward reducing driving noises. The slave cylinder according to the state of the art uses a coil spring as the pressure spring. Although this coil spring is principally secured against torsion, its elasticity leads to a relative movement of the bearing with respect to the housing when the clutch release sleeve activates against and loads the spring plate or spring collar. This movement, which occurs with each coupling process, on the one hand loads the pressure spring, which pressure spring must be made of high-quality material to have a sufficient life span. On the other hand, the pressure spring in slave cylinders is frequently shielded by a bellows-seal to keep grime and dust from entering between the clutch release sleeve and housing, or annular piston and housing, and cause premature wear and tear. However, a bellows-seal cannot withstand torsion and would be destroyed by it. For this reason, at least one of the ends of the bellows-spring must have a plain bearing or slide or sliding or friction bearing to adjust the relative movement between the clutch release sleeve and the housing. This required bearing not only makes the bellows-seal expensive to produce, but also makes great demands with respect to the seal, and particularly the sealed positioning of the plain bearing.

The increasing variety in the design of motor vehicles requires increasingly less space in the motor cavity. All aggregates and components must thus be designed as compactly as possible. For the pre-load stress exerted by the pressure spring to be sufficiently high on the one hand, but to achieve a spring characteristic that is as flat as possible on the other hand, the spring must have a sufficient number of turns and is thus long in construction. The length of the coil spring also defines the length of the slave cylinder.

OBJECT OF THE INVENTION

Based on this problem, it is an object of the present invention to improve a generic slave cylinder in such a manner that it cannot be relatively torsioned between the clutch release sleeve and the housing, and that the construction size is reduced in an axial direction, whereby the anticipated design may be cost effective and simple to manufacture.

SUMMARY OF THE INVENTION

To solve this problem, the generic slave cylinder is particularly suitable because its pressure spring is a sinuous spring and radial shoulders or reliefs acting in the opposite direction are provided at the clutch release sleeve and the housing to secure against torsion, and because the ends of said sinuous spring are positioned with contact on said shoulders.

In other words and in accordance with one embodiment, the present invention teaches that the above object can be achieved by the use of a generic slave cylinder having a pressure spring, which pressure spring may be characterized as a sinuous spring or zig-zag or no-sag spring. The slave cylinder can have radial shoulders or steps or reliefs, which shoulders can be provided at the clutch release sleeve and at the housing, and the ends of the pressure spring are positioned with contact on the shoulders. The shoulders act in the direction opposite to the spring ends thereby securing against torsion.

In accordance with one embodiment, the pressure spring has a plurality of turns or threads or revolutions around a longitudinal axis. Each one of the plurality of turns has portions. The portions of each one of the plurality of turns may be characterized in that one portion of a first turn is not in alignment with at least a second portion of a first turn. This non-alignment of the portions of each one of the plurality of turns creates turns which may be characterized as having concave upward and concave downward portions around a longitudinal axis. Therefore, each one of the plurality of turns has: at least one relative maximum portion, which at least one relative maximum portion is higher around a longitudinal axis than all of its immediate neighboring portions; and at least one relative minimum portion, which at least one relative minimum portion is lower around a longitudinal axis than all of its immediate neighboring portions.

In accordance with one embodiment, each one of the plurality of turns may be further configured and disposed so that each relative maximum portion of each one of the plurality of turns may contact a relative minimum portion of an adjacent one of the plurality of turns, while each relative minimum portion of each one of the plurality of turns may contact a relative maximum portion of an adjacent one of the plurality of turns.

In one possible embodiment, the pressure spring is substantially sinusoidal around a longitudinal axis. The spring has a plurality of turns or threads or revolutions around the longitudinal axis, which spring forms a substantially helical shape. The spring has at least two outer turns at the ends of the spring and may have a plurality of inner turns located between the outer turns at the ends of the spring. Each one of the plurality of turns has portions. The spring also preferably further has connections or connectors or fasteners which connections are circumferentially displaced along the turns of the spring. The connections serve to fasten at least one portion of at least a first turn to at least one portion of at least a second turn, which at least a second turn is located adjacent to at least a first turn. Each outer turn is substantially planar around the longitudinal axis of the spring. The circumferentially displaced fastening of each inner turn to at least a second adjacent turn creates a sinusoidal configuration of the inner turns around the longitudinal axis. With the fastening of the turns configurated in this manner, each inner turn has at least one relative maximum portion and at least one relative minimum portion. The fastening configuration of the turns in this manner serves to create a spring with a much greater force per displacement distance, that is a greater spring constant, than the known coil spring.

This design on the one hand drastically reduces the construction length of the slave cylinder because the length of the sinuous springs is significantly shorter while the spring path and the spring pressure remain the same. In this way, tolerances can be highly effectively compensated for essentially without any impact on the pre-stress. Due to the short construction length and the design as such, the ends of the sinuous springs cannot, or, if at all, be only very insignificantly torsioned against each other. The flat ends of the sinuous spring can be highly effectively positioned to contact the shoulders which shoulders are arranged at the dust shield. The shoulders are rigidly connected to the clutch release sleeve, by means of milling cuts, and to the connection flange of the slave cylinder, and are relatively simple to manufacture. By avoiding a relative turn when the clutch release sleeve is activated to the spring plate of the friction clutch, it is possible to use commercial bellows-seals which are on the one hand solidly connected to the clutch release sleeve, and on the other hand to the housing of the slave cylinder. Because the plain bearing seal is obsolete, the costs for the bellows-seal as well as the manufacturing costs as such may be reduced considerably.

In one possible embodiment the pressure spring is formed from material having, for example, a prismatic cross-section such as a ribbon. This relatively flat configuration of spring material facilitates the connections between the turns, and allows for more sturdy connections. Additionally, this configuration of spring material aids in providing a tight connection between the ends of the spring and the corresponding shoulders at the clutch release sleeve and the housing respectively.

The sinuous spring has preferably less than five turns.

This design sufficiently reduces the required construction space of the slave cylinder in the axial direction.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Several embodiments of the current invention are described in greater detail below with reference to the accompanying drawings in which.

DESCRIPTION OF THE PREFERRED EMBODIMENT

Figure 1:
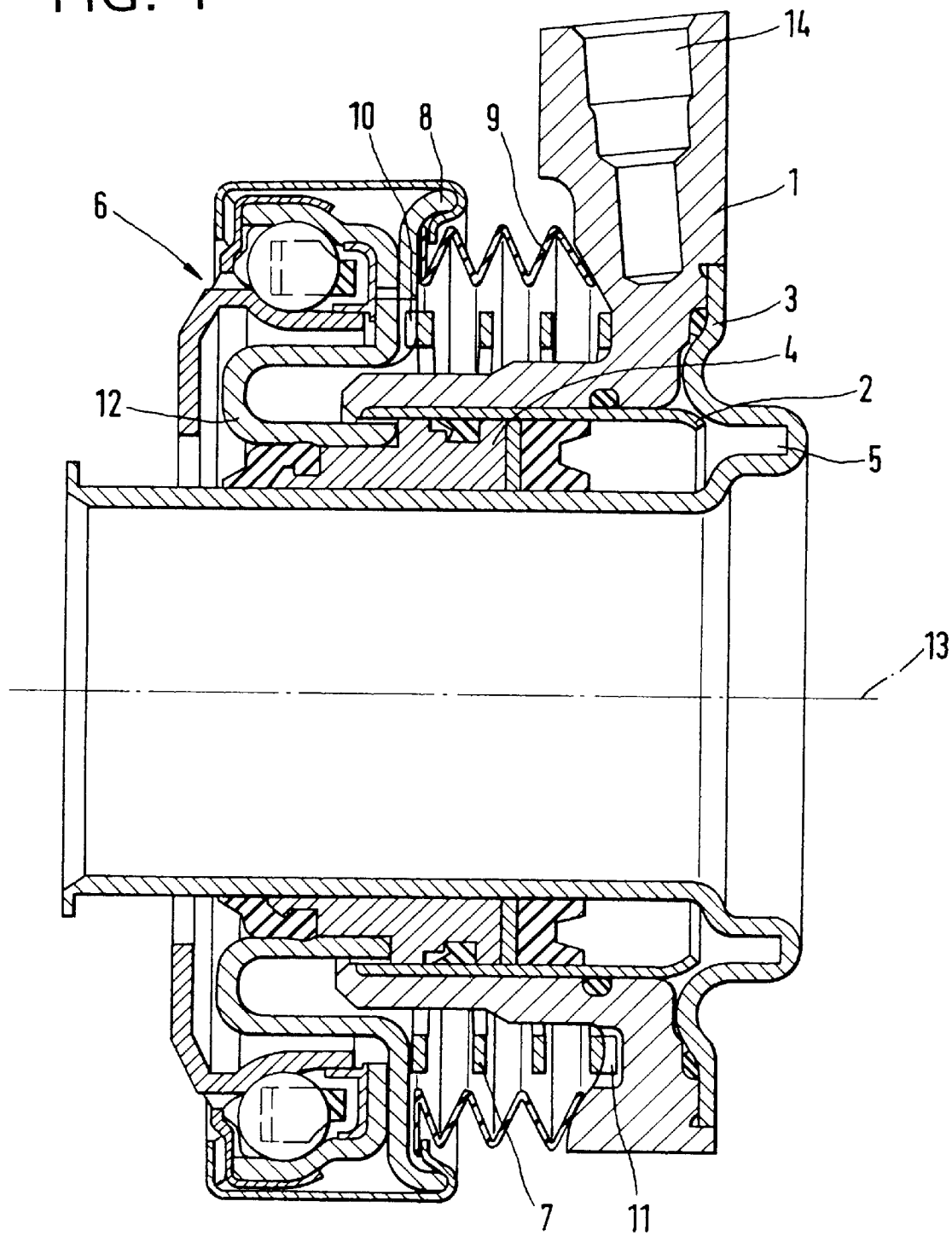
FIG. 1 shows a slave cylinder in axial cut.

FIG. 1 shows the slave cylinder, which is formed concentrically to an axis 13 around which a gear shaft rotates in assembled condition (not shown here). The slave cylinder has a housing 1, a cylinder casing 2, and an inner portion 3. Between the inner portion 3 and the casing, or the cylinder casing 2 connected thereto, an annular piston 4 is arranged, wherein the annular piston 4 is axially displaceable. The slave cylinder can be hydraulically connected to a master cylinder by means of a connector 14, and said slave cylinder can be activated by a clutch pedal of a motor vehicle. The hydraulic liquid which flows into a pressure chamber 5 displaces the annular piston 4 in the illustration toward the left. At the same time, a clutch release sleeve 6, which is rigidly connected to the annular piston 4 by means of a fastening ring 12, is displaced in the direction of a friction clutch (also not shown here), where it makes contact with a membrane spring (also not shown here) and disengages the clutch by means of further axial movement.

The clutch release sleeve 6 is shielded by a dust ring 8. A bellows-seal 9 may be provided between the clutch release sleeve 6 and the housing 1, which bellows-seal 9 prevents grime from entering between the housing 1, the cylinder casing 2 and the annular piston 4. A sinuous spring or pressure spring 7 having four turns is arranged axially between the clutch release sleeve 6 and the housing 1 and, in assembled condition, pre-stresses the clutch release sleeve 6 of the slave cylinder in the direction of the membrane spring of a clutch disc.

To secure the pressure spring 7 against torsion, radial and opposite acting shoulders 10, 11 are arranged at the dust cover 8, which shoulders 10, 11 were preferably achieved by a turning or milling cuts. The two ends of the pressure spring 7 are positioned with contact at these shoulders 10, 11, so that the pressure spring 7 prevents a relative torsion between the clutch release sleeve 6 and the housing 1.

Figure 1A:
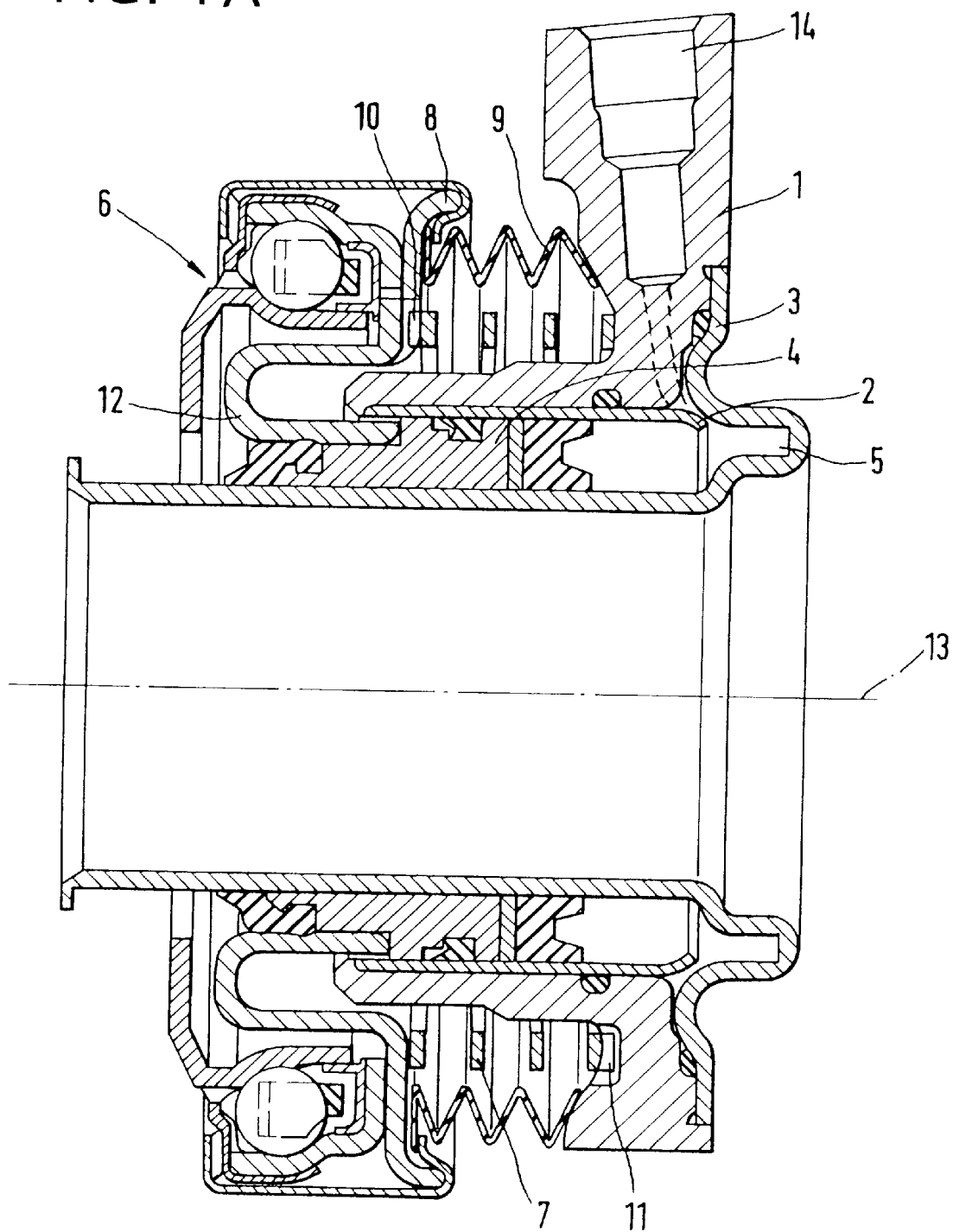
FIG. 1A shows FIG. 1 in more detail.

The embodiment shown in FIG. 1A depicts the flow pathway between the connector 14 of the master cylinder to the slave cylinder and the pressure chamber 5 of the slave cylinder in dotted lines. In accordance with this embodiment, the hydraulic fluid flows through the connector 14 and into the pressure chamber 5 thereby displacing the annular piston 4 in the illustration to the left.

Figure 2:
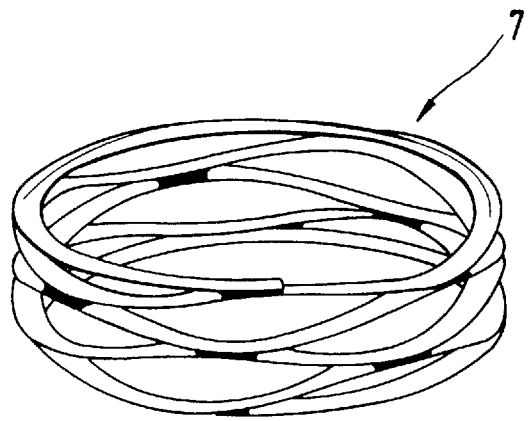
FIG. 2 shows a perspective representation of a pressure spring.

FIG. 2 shows a perspective representation of a sinuous spring 7.

Figure 3:
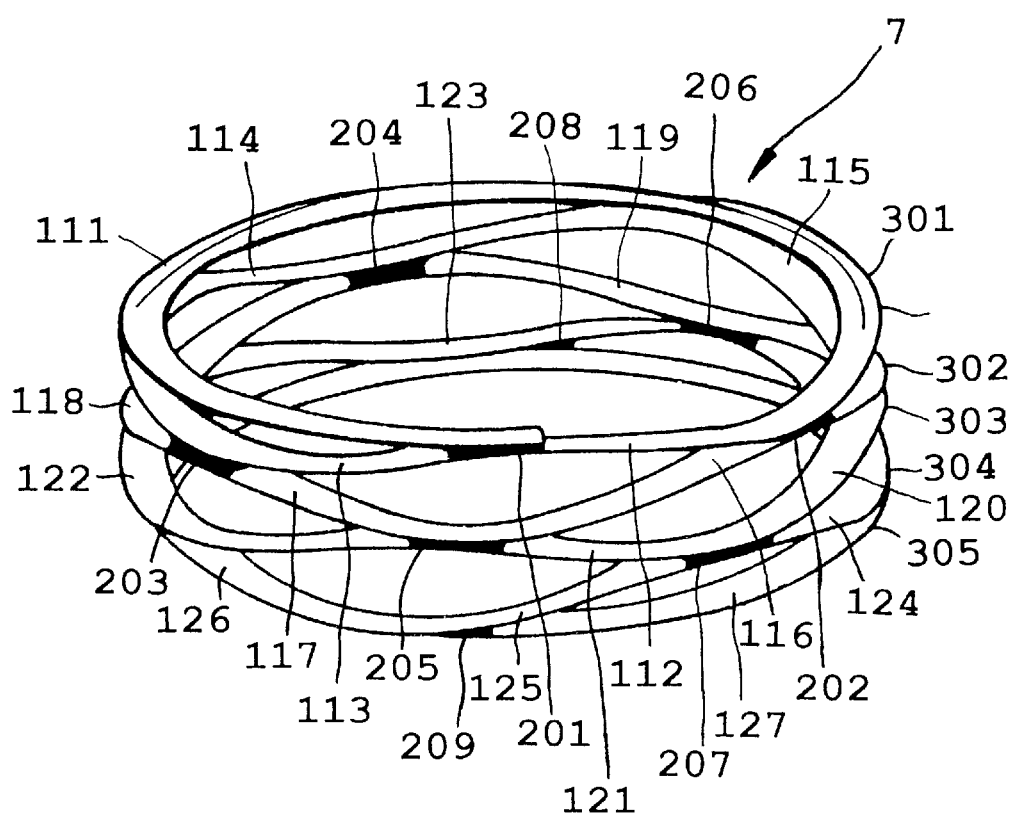
FIG. 3 shows one embodiment of the pressure spring of FIG. 2 enlarged and in greater detail.

FIG. 3 shows one embodiment of the spring 7 of FIG. 2. In FIG. 3, a portion 111 of an outer turn 301 spans between a connection 201 and a connection 202. A portion 112 of an outer turn 301 spans between a connection 202 and a connection 201. A portion 113 of an inner turn 302 spans between the connection 201 and the connection 203. A portion 114 of an inner turn 302 spans between a connection 203 and a connection 204. A portion 115 of an inner turn 302 spans between a connection 204 and a connection 202. A portion 116 of an inner turn 302 spans between a connection 202 and a connection 205. A portion 117 of an inner turn 303 spans between a connection 205 and a connection 203. A portion 118 of an inner turn 303 spans between a connection 203 and a connection 204. A portion 119 of an inner turn 303 spans between a connection 204 and a connection 206. A portion 120 of an inner turn 303 spans between a connection 206 and a connection 207. A portion 121 of an inner turn 303 spans between a connection 207 and a connection 205. A portion 122 of an inner turn 304 spans between a connection 205 and a connection 208. A portion 123 of an inner turn 304 spans between a connection 208 and a connection 206. A portion 124 of an inner turn 304 spans between a connection 206 and a connection 207. A portion 125 of an inner turn 304 spans between a connection 207 and a connection 209. A portion 126 of an outer turn 305 spans between a connection 209 and a connection 208. A portion 127 of an outer turn 305 spans between a connection 208 and a connection 209.

In accordance with one embodiment, FIG. 3 further shows the sinusoidal or zig-zag configuration of the spring. Turn 301 comprises portion 111 and portion 112. Turn 301 is an outer turn located at an end of the spring and is relatively planar. Turn 302 comprises portion 113, portion 114, portion 115 and portion 116. Turn 302 comprises a relative minimum portion located at connection 203 between portion 113 and portion 114, a relative minimum portion located at connection 204 between portion 114 and portion 115, and a relative maximum portion located at connection 202 between portion 115 and portion 116. A relative minimum portion is located at connection 205 between portion 116 of turn 302 and portion 117 of turn 303. Turn 303 further comprises: a relative maximum portion located at connection 203 between portion 117 and portion 118, a relative maximum portion located at connection 204 between portion 118 and portion 119, a relative maximum portion located at connection 206 between portion 119 and portion 120, and a relative minimum portion located at connection 207 between portion 120 and portion 121. A relative maximum portion is also located at connection 205 between portion 121 of turn 303 and portion 122 of turn 304. Turn 304 further comprises; a relative minimum portion located at connection 208 between portion 122 and portion 123, a relative maximum portion located at connection 206 between portion 123 and portion 124, and a relative maximum portion located at connection 207 between portion 124 and portion 125. A relative minimum portion is also located at connection 209 between portion 125 of turn 304 and portion 126 of turn 305. Turn 305 comprises portion 126 and portion 127. Turn 305 is an outer turn located at an end of the spring and is relatively planar.

One feature of the invention resides broadly in the slave cylinder for the operation of a friction clutch, especially in motor vehicles, with a housing 1, an inner portion 3, an annular or cylindrical piston 4 which is positioned between the housing 1 and the inner portion 3, a clutch release sleeve or clutch throwout sleeve or coupling socket joint 6 which is in contact with the annular piston 4 and which clutch release sleeve 6 can be axially displaced with respect to the housing 1, as well as a spring or pressure spring or compression spring 7 which is supported by both the clutch release sleeve 6 and the housing 1 and is secured against torsion. The pressure spring 7 may be characterized as a sinuous spring or zig-zag spring or no-sag spring 7, that radial shoulders or steps or reliefs 10, 11 which shoulders 10, 11 act in the opposite direction to the pressure spring 7 and are provided at the clutch release sleeve 6 and the housing 1 to secure against torsion, and that the ends of the pressure spring 7 are positioned to make contact at the ends of said shoulders 10,11.

Another feature of the invention resides broadly in the slave cylinder characterized in that the sinuous spring 7 has less than five turns.

Some examples of hydraulic master and slave cylinders which could possibly utilize the present invention are disclosed by the following U.S. patent applications: Ser. No. 08/389,012 to Grosspietsch et al., entitled "Cylinder with Plug-in Connection"; Ser. No. 08/428,700 to Link et al., entitled "Hydraulic System with a Multiplicity of Cylinders"; Ser. No. 08/561,288 to Grosspietsch et al., entitled "Cylinder for Hydraulic Systems, in particular for Motor Vehicles".

Some examples of clutch assemblies and various components associated therewith which could possibly utilize the present invention may be disclosed in the following U.S. patents: U.S. Pat. No. 5,211,099 to Grosspietsch et al., entitled "Slave Cylinder for a Hydraulic Actuating System of a Motor Vehicle Friction Clutch"; U.S. Pat. No. 4,745,999 to Brugger et al., entitled "Clutch Operating Cylinder for a Pressure-Medium Operated Clutch"; U.S. Pat. No. 4,807,731 to Collins entitled "Clutch and Brake Assembly"; U.S. Pat. No. 4,637,505 to Huber entitled "Fluid-Operated Clutch Disengaging Apparatus"; U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the present invention are disclosed by the following U.S. patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some examples of bellows-type bearing seals which could possibly be utilized with the present invention are disclosed by the following U.S. patents: U.S. Pat. No. 4,732,398 to Biss, dated Mar. 22, 1988 and entitled "Bellows-Type Bearing Seal and Method of Use; U.S. Pat. No. 4,854,611 to Press, dated Aug. 8, 1989 and entitled "Fail-Safe Bellows Assembly"; U.S. Pat. No. 4,685,300 to Steer, dated Aug. 11, 1987 and entitled "Seal Means for a Master Cylinder"; and U.S. Pat. No. 4,812,073 to Blumberg, et al., dated Mar. 14, 1989 and entitled "Method and Apparatus for Fastening a Sealing Bellows".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 196 22 773.9, filed on Jun. 7, 1996, having inventors Wolfgang Grosspietsch, Herbert Voit, and Angelika Ebert, and DE-OS 196 22 773.9 and DE-PS 196 22 773.9, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A hydraulic actuator for actuating a clutch assembly of a motor vehicle, said hydraulic actuator comprising:

a housing;

a piston to actuate a clutch assembly;

said piston being disposed adjacent said housing;

a clutch release structure being disposed to be operatively actuated by said piston;

a spring being disposed to provide a pre-load force in said actuator to operatively position said clutch release structure;

said spring having an axis;

said spring comprising:
      a plurality of turns around the axis;
      said turns comprising at least one first portion and at least one second portion;
   said at least one first portion being disposed adjacent said at least one second portion;
      at least one first bend being disposed between said at least one first portion and said at least one second portion; and
      said at least one first bend disposing said at least one first portion out of alignment with said at least one second portion.

2. The hydraulic actuator according to claim 1 wherein:
   said turns of said spring further comprise at least one third portion;
   said at least one third portion being disposed adjacent said at least one second portion;
   said spring comprises at least one second bend being disposed between said at least one second portion and said at least one third portion;
   said at least one second bend disposing said at least one second portion out of alignment with said at least one third portion;
   said at least one second portion being disposed between said at least one first portion and said at least one third portion;
   said at least one first portion extending in a first direction;
   said at least one second portion extending in a second direction;
   said at least one third portion extending in a third direction; and
   said at least one first portion, said at least one second portion and said at least one third portion extending in said first, second and third directions to form a zig-zag configuration.

3. The hydraulic actuator according to claim 2 wherein said zig-zag configuration comprises a plurality of zig-zags around the axis of said spring.

4. The hydraulic actuator according to claim 3 wherein said plurality of zig-zags comprises a substantially sinusoidal configuration.

5. The hydraulic actuator according to claim 4 wherein said at least one first bend of one of said plurality of turns contacts said at least one second bend of another one of said plurality of turns.

6. The hydraulic actuator according to claim 5 wherein said at least one first bend of one of said plurality of turns contacts said at least one second bend of an adjacent one of said plurality of turns.

7. The hydraulic actuator according to claim 6 wherein:
   said spring comprises a plurality of connections; and
   each of said plurality of connections connects said at least one first bend of one of said plurality of turns to said at least one second bend of another one of said plurality of turns.

8. The hydraulic actuator according to claim 7 wherein said plurality of turns comprises a substantially helical configuration.

9. The hydraulic actuator according to claim 8, said hydraulic actuator comprising:
   an arrangement to minimize turning of said spring;
   said arrangement comprising a first shoulder and a second shoulder.

10. The hydraulic actuator according to claim 9, wherein:
    said spring comprises a first end and a second end;
    said first end of said spring being disposed to contact said first shoulder;
    said second end of said spring being disposed to contact said second shoulder.

11. The hydraulic actuator according to claim 10, wherein:
    said first shoulder is disposed on said housing;
    said clutch release structure comprises a clutch release sleeve; and
    said second shoulder is disposed on said clutch release sleeve.

12. The hydraulic actuator according to claim 11 wherein:
    said at least one first portion of said spring comprises a cross-section; and
    said cross-section of said at least one first portion of said spring comprises a prismatic configuration.

13. The hydraulic actuator according to claim 12 wherein:
    said plurality of turns comprises a cross-section; and
    said cross-section of said plurality of turns comprises a prismatic configuration.

14. The hydraulic actuator according to claim 13 wherein said plurality of turns comprises less than five turns.

15. The hydraulic actuator according to claim 1, said hydraulic actuator comprising:
    an arrangement to minimize turning of said spring;
    said arrangement comprising a first shoulder and a second shoulder.

16. The hydraulic actuator according to claim 15, wherein:

said spring comprises a first end and a second end;

said first end of said spring being disposed to contact said first shoulder;

said second end of said spring being disposed to contact said second shoulder.

17. The hydraulic actuator according to claim 16, wherein:

said first shoulder is disposed on said housing;

said clutch release structure comprises a clutch release sleeve; and said second shoulder is disposed on said clutch release sleeve.

18. The hydraulic actuator according to claim 17 wherein:

said turns of said spring further comprise at least one third portion;

said at least one third portion being disposed adjacent said at least one second portion;

said spring comprises at least one second bend being disposed between said at least one second portion and said at least one third portion;

said at least one second bend disposing said at least one second portion out of alignment with said at least one third portion;

said at least one second portion being disposed between said at least one first portion and said at least one third portion;

said at least one first portion extending in a first direction;

said at least one second portion extending in a second direction;

said at least one third portion extending in a third direction; and said at least one first portion, said at least one second portion and said at least one third portion extending in said first, second and third directions to form a zig-zag configuration.

\* \* \* \* \*